(No Model.)
S. COOK.
ROLLER COLTER.
No. 407,062. Patented July 16, 1889.
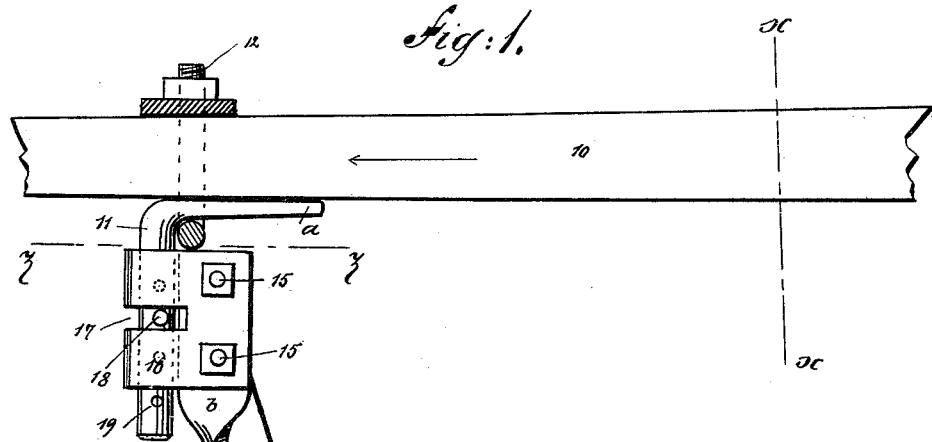
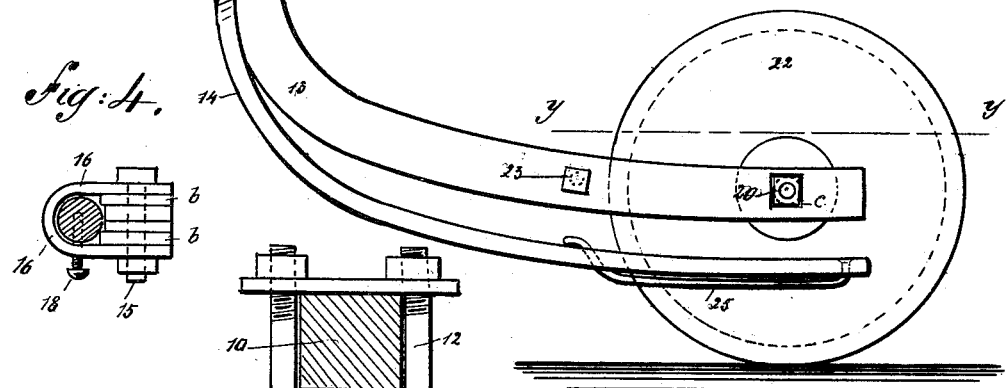
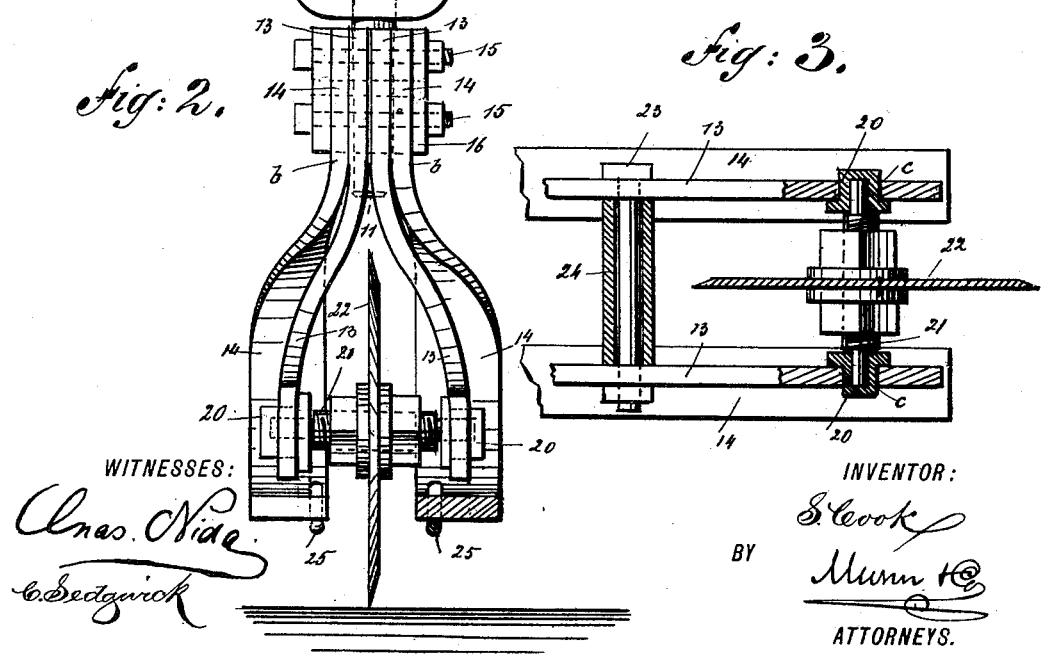
WITNESSES:
Chas. Nide
C. Sedgwick
INVENTOR:
S. Cook
BY
Munn &Co.
ATTORNEYS.

UNITED STATES PATENT OFFICE.

SIDNEY COOK, OF ORLANDO, FLORIDA, ASSIGNOR TO HIMSELF AND WILLIAM M. OGILVIE, OF SAME PLACE.

ROLLER-COLTER.

SPECIFICATION forming part of Letters Patent No. 407,062, dated July 16, 1889.

Application filed November 28, 1888. Serial No. 292,063. (No model.)

*To all whom it may concern:*

Be it known that I, SIDNEY COOK, of Orlando, in the county of Orange and State of Florida, have invented a new and Improved Roller-Colter, of which the following is a full, clear, and exact description.

The object of this invention is to provide a plow-colter which will act to cut weeds and débris of any kind in advance of the shaft; and to the end named the invention consists in the construction and arrangement of parts, as will be hereinafter fully described and claimed.

Reference is to be had to the accompanying drawings, forming a part of this specification, in which similar figures and letters of reference indicate corresponding parts in all the views.

Figure 1 is a side view of a portion of a plow-beam with my improved colter connected thereto, the connecting-shackle being shown in section. Fig. 2 is a rear view of the colter, the plow-beam being shown in section on line $x\ x$ of Fig. 1. Fig. 3 is a sectional plan view, parts being broken away, on line $y\ y$ of Fig. 1; and Fig. 4 is a sectional view on line $z\ z$ of Fig. 1.

In the drawings, 10 represents a plow-beam of ordinary form. To this beam and near the forward end thereof there is secured a heavy pivot-pin 11, said pin being provided with a flattened and rearwardly-extending arm or projection $a$, said arm being at about right angles to the main portion of the pin. Connection between the pin and the plow-beam is established by means of a U-shackle 12, which passes about the beam and the arm $a$ of the pin 11, the shackle being held to the beam in the ordinary manner.

The pin 11 serves as a support for a frame made up of downwardly and rearwardly extending arms 13 and for spring-arms 14, the upper section $b$ of said arms fitting against the outer faces of the arms 13, the parts being clamped together by bolts 15, which pass through both members of a U-shaped head 16, that is formed with a slot 17.

The head 16 extends forward beyond the forward edges of the arms 13 and 14 a distance sufficient to accommodate the pivot-pin 11, the head being held to place upon the pin 11 by a pin 18, which is inserted in any desired one of a series of apertures 19, that are formed in the said pin 11, one or both ends of the pin 18 extending outward and into the slot 17. Just below the head 16 the arms 14 are given a quarter-turn, so that their flat sides will be substantially parallel with the ground over which they pass, these lower ends acting as shoes.

Near the rear ends of the arms 13 there are formed apertures $c$, preferably square, and in these apertures there are fitted bushings 20, which form bearings for a shaft 21, upon which a circular colter 22 is mounted, and through the arms 13, in advance of the colter, there is passed a bolt 23, a sleeve 24 being placed between the arms 13, the sleeve and bolt serving not only to rigidly unite but also to prevent all collapsing of the arms.

Although not positively essential, I prefer to provide each of the arms 14 with supplemental shoes 25, said shoes being made from pieces of heavy wire or rods that are passed through apertures formed in the spring-arms, and extend forward of the forward edge of the colter.

In operation the colter-supporting frame is adjusted to the required vertical height by bringing the pin 18 into engagement with the proper aperture 19 in the pin 11, and then as the plow is drawn forward the arms 14 will bear hard upon the ground and press any weeds or other obstructions that there may be firmly against the surface of the ground, thereby holding them taut at the time the colter 22 passes over them, the supplemental shoes increasing the friction of grass and weeds when drawn laterally by the downward pressure of the colter. By providing the bushings 20 I arrange for the renewal of the bearings of the shaft 21, as will be readily understood. Then, too, the supporting-frame is eased from any undue shock should a stone or other obstruction of like nature be encountered.

In side-hill plowing this colter will be found to act in a decidedly advantageous manner, owing to the fact that both spring-arms will bear upon the ground.

Having thus described my invention, I claim as new and desire to secure by Letters Patent—

1. The combination, with the colter-head having rearwardly-extending arms secured at their forward ends thereto, and the colter journaled in the rear ends of said arms, of the weed-depressing arms secured to the colter-head and curved downward and rearward under the colter-arms, substantially as set forth.

2. The combination, with the colter-arms having a head at their forward ends and the colter journaled in their rear ends, of parallel spring-arms secured at their forward ends to said head, and extending rearwardly under the colter-axis, substantially as set forth.

3. The combination, with the colter-arms set edgewise and projecting upward at their forward ends, and the weed-holding arms extending flatwise under the colter-arms to or beyond the axis of the colter, and having flat upper ends parallel with the adjacent ends of the colter-arms, of the U-shaped head, embracing the ends of said arms and bolts extending therethrough, substantially as set forth.

4. The combination, with the flat weed-depressing arm having apertures near its rear lower end, of a guard wire or rod on the under side of said arm with its ends secured in said openings, substantially as set forth.

5. The combination, with the colter-arms having longitudinally-aligned apertures in their rear or lower ends, and the socketed bushings 20, inserted in said apertures, and having flanges bearing on the inner sides of said arms, of the colter having a shaft the ends of which turn in the socket in said bushings, and a tie-rod connecting the said arms beyond the colter, substantially as set forth.

6. A colter comprising the vertical pivot-pin 10, having transverse apertures and a rearward-projecting upper end $a$, the U-shaped head 16, having bolt-holes through its sides, and a transverse slot 17 through it at its bend, the pin 18 passed through said apertured pin and slot, the colter and weed-depressing arms bolted flatwise between the rear ends of said head and extending downward and rearward therefrom, the latter arms extending below and in vertical alignment with the former or colter arms, and the colter journaled in the rear ends of the colter-arms above the rear ends of the weed depressing or holding arms, substantially as set forth.

SIDNEY COOK.

Witnesses:
CHAS. F. ROGERS,
W. F. HEIZER.